United States Patent
Friday et al.

(10) Patent No.: US 7,559,981 B2
(45) Date of Patent: Jul. 14, 2009

(54) AIR FILTRATION MEDIA COMPRISING OXIDIZING AGENT-TREATED METAL-DOPED SILICON-BASED GEL AND ZEOLITE MATERIALS

(75) Inventors: David K. Friday, Havre de Grace, MD (US); Fitzgerald A. Sinclair, Bear, DE (US); Michael C. Withiam, Landenberg, PA (US)

(73) Assignee: J.M. Huber Corporation, Edison, NJ (US)

( * ) Notice: Subject to any disclaimer, the term of this patent is extended or adjusted under 35 U.S.C. 154(b) by 440 days.

(21) Appl. No.: 11/481,613

(22) Filed: Jul. 6, 2006

(65) Prior Publication Data

US 2008/0006153 A1 Jan. 10, 2008

(51) Int. Cl.
*B01D 53/02* (2006.01)
*B01J 20/00* (2006.01)

(52) U.S. Cl. ............................. 96/153; 502/71; 502/407; 423/338

(58) Field of Classification Search .................. 96/108, 96/153; 95/90, 129; 423/239.1, 239.2, 338; 502/60, 64, 71, 407
See application file for complete search history.

(56) References Cited

U.S. PATENT DOCUMENTS

| | | | |
|---|---|---|---|
| 1,537,519 A | 5/1925 | Yablick | |
| 2,521,713 A | 9/1950 | Goetz et al. | |
| 2,698,062 A * | 12/1954 | Veltman et al. | 95/117 |
| 3,803,803 A * | 4/1974 | Raduly et al. | 95/134 |
| 4,306,106 A | 12/1981 | Kerr et al. | |
| 4,572,178 A | 2/1986 | Takase et al. | |
| 5,053,169 A | 10/1991 | Price | |
| 5,063,196 A | 11/1991 | Doughty et al. | |
| 5,141,724 A * | 8/1992 | Audeh et al. | 423/210 |
| 5,529,763 A * | 6/1996 | Peng et al. | 423/246 |
| 5,653,875 A | 8/1997 | Betz et al. | |
| 5,977,212 A | 11/1999 | Ebner et al. | |
| 5,985,169 A | 11/1999 | Miller et al. | |
| 6,068,682 A | 5/2000 | Kuznicki et al. | |
| 6,238,460 B1 | 5/2001 | Deng et al. | |
| 6,361,584 B1 | 3/2002 | Stevens et al. | |
| 6,565,627 B1 * | 5/2003 | Golden et al. | 95/96 |
| 6,572,681 B1 * | 6/2003 | Golden et al. | 95/122 |
| 6,670,302 B2 | 12/2003 | Glemza et al. | |
| 6,837,917 B2 | 1/2004 | Karwacki et al. | |
| 6,764,535 B1 * | 7/2004 | Lansbarkis et al. | 96/132 |
| 6,796,896 B2 | 9/2004 | Laiti | |
| 2008/0156194 A1 * | 7/2008 | Withiam et al. | 96/154 |

FOREIGN PATENT DOCUMENTS

| | | |
|---|---|---|
| GB | 280947 | 2/1929 |
| WO | 00/40324 | 7/2000 |

OTHER PUBLICATIONS

Wason, Satish K., "Silica Gels", Pigment Handbook: vol. 1, pp. 175-181, 1988, John Wiley & Sons, Inc.

\* cited by examiner

*Primary Examiner*—Frank M Lawrence
(74) *Attorney, Agent, or Firm*—Cheryl J. Tubach; Patricia L. Ades

(57) ABSTRACT

An environmental control for use in air handling systems that are required to provide highly effective filtration of noxious gases is provided. In one embodiment, a filtration system utilizes a novel combination of at least one metal-doped silica-based gel and zeolite materials to trap and/or modify, and remove such undesirable gases (such as ammonia, ethylene oxide, formaldehyde, and nitrous oxide, as examples) from an enclosed environment. The gel component exhibits specific porosity requirements and density measurements; the zeolite component is generally acidic and is preferably not reacted with any salts or like substances. The novel combination of such gels and zeolites permits highly effective noxious gas filtration over a wide range of known toxic industrial chemicals such that excellent breakthrough results are attained, particularly in comparison with prior media filtration products. Also included is the presence of an oxidizing agent on the gel materials to aid in capturing nitrogen dioxide and preventing conversion of such a product to NO. Methods of using and the application within specific filter apparatuses are also encompassed within this invention.

34 Claims, No Drawings

US 7,559,981 B2

AIR FILTRATION MEDIA COMPRISING OXIDIZING AGENT-TREATED METAL-DOPED SILICON-BASED GEL AND ZEOLITE MATERIALS

FIELD OF THE INVENTION

The present invention relates generally to environmental control in air handling systems that are required to provide highly effective filtration of noxious gases. In one embodiment, a filtration system utilizes a novel combination of at least one metal-doped silica-based gel and zeolite materials to trap and/or modify, and remove such undesirable gases (such as ammonia, ethylene oxide, formaldehyde, and nitrous oxide, as examples) from an enclosed environment. The gel component exhibits specific porosity requirements and density measurements; the zeolite component is generally acidic and is preferably not reacted with any salts or like substances. The novel combination of such gels and zeolites permits highly effective noxious gas filtration over a wide range of known toxic industrial chemicals such that excellent breakthrough results are attained, particularly in comparison with prior media filtration products. Also included is the presence of an oxidizing agent on the gel materials to aid in capturing nitrogen dioxide and preventing conversion of such a product to NO. Methods of using and the application within specific filter apparatuses are also encompassed within this invention.

BACKGROUND OF THE INVENTION

There is an ever-increasing need for air handling systems that include air filtration systems that can protect an enclosure against noxious airborne vapors and particulates released in the vicinity of the enclosure. Every year there are numerous incidents of noxious vapors contaminating building environments and causing illness and disruptions. There is also a current effort to protect buildings and other significant enclosures against toxic airborne vapors and particulates being released as part of terrorist acts. As a result, new filter design requirements have been promoted by the United States government to protect against certain toxic gases. Whether in a civilian or military setting, a typical air filtration system that contains only a particulate filter (for example, a cardboard framed fiberglass matt filter) provides no protection at all against toxic vapors. Commercially available electrostatic fiber filters exhibit higher removal efficiencies for smaller particles than standard dust filters, but they have no vapor filtration capability. HEPA ("High-Efficiency Particulate Air") filters are used for high-efficiency filtration of airborne dispersions of ultrafine solid and liquid particulates such as dust and pollen, radioactive particle contaminants, and aerosols. However, where the threat is a gaseous chemical compound or a gaseous particle of extremely small size (i.e., <0.001 microns), the conventional commercially-available HEPA filters cannot intercept and control those types of airborne agents.

The most commonly used filter technology to remove vapors and gases from contaminated air is activated carbon. Such carbon-based gas filtration has been implemented in a wide variety of vapor-phase filtration applications including gas masks as well as military vehicle and shelter protection. In these applications, activated carbon impregnated with metal salts is used to remove a full range of toxic vapors (such as arsine, Sarin gas, etc.). These toxic gases require a high filtration efficiency typically not needed for most commercial applications. To the contrary, typical commercial filters generally include activated carbon materials on or incorporated within non-woven fabrics (fiber mats, for instance), with coexisting large fixed beds of packed adsorbent particles. Such commercial filters used for air purification generally are used until an easily measurable percentage (e.g., 10%) of the challenge chemical(s) concentration is measured in the effluent. Much greater efficiencies (e.g., 0.001%) are desired for gas masks and military collective protection applications (such as vehicles, mobile shelters, and fixed sites).

Impregnated, activated carbons are used in applications where it is required to remove gases that would not otherwise be removed through the use of unimpregnated activated carbons. Such prior art impregnated carbon formulations often contain copper, zinc, molybdenum, silver, and sometimes chromium impregnated on an activated carbon. These adsorbents are effective in removing a large number of toxic materials, such as cyanide-based gases and vapors.

In addition to a number of other inorganic materials, which have been impregnated on activated carbon, various organic impregnates have been found useful in military applications for the removal of cyanogen chloride. Examples of these include triethylenediamine (TEDA) and pyridine-4-carboxylic acid.

Various types of high-efficiency filter systems, both commercial and military types, have been proposed for building protection using copper-silver-zinc-molybdenum-triethylenediamine impregnated carbon for filtering a broad range of toxic chemical vapors and gases. However, such specific carbon-based filters have proven ineffective for other gases, such as, ammonia, ethylene oxide, formaldehyde, and nitrogen oxides. As these gases are quite prominent in industry and can be harmful to humans when present in sufficient amounts (particularly within enclosed spaces), and, to date, other filter devices have proven unsuitable for environmental treatment and/or removal thereof, there exists a definite need for a filter mechanism to remedy these deficiencies. This has proven very difficult to provide a filter medium that effectively removes all such noxious gases simultaneously. Of particular difficulty is the ability to remove such disparate gases in a wide range of relative humidity environments. Each gas is affected differently by adsorbed water. For ammonia, it is typically most difficult (design limiting) to filter at a low relative humidity since adsorbed water can enhance the ammonia affinity of the target adsorbents. For ethylene oxide the reverse is true since exposure to high humidity and the commensurate increase in adsorbed water, is problematic in designing a proper filter system. To date, no filtration system having a relatively small amount of filter medium present has been provided that effectively removes all such gases simultaneously for long durations of time at relatively high challenge concentrations (e.g., 1,000 ppm) without eventually eluting through the filter.

It has been realized that silica-based compositions make excellent gas filter media. However, little has been provided within the pertinent prior art that concerns the ability to provide uptake and breakthrough levels by such filter media on a permanent basis and at levels that are acceptable for large-scale usage. Uptake basically is a measure of the ability of the filter medium to capture a certain volume of the subject gas in a short period of time (fast mass transfer); breakthrough is an indication of the loss of usefulness of the filter medium (a combination of capture and filter medium equilibrium capacity). Thus, it is highly desirable to find a proper filter medium that exhibits a high uptake (and thus quick capture of large amounts of noxious gases) and long breakthrough times (and thus, coupled with uptake, the ability to not only effectuate quick capture but also extensive lengths of time to reach the filter capacity). The standard filters in use today are limited for noxious gases, such as ammonia, to relatively quick breakthrough times, caused by slow uptake and/or low filter capacity. There is a need to develop a new filter medium that increases uptake and breakthrough, as a result.

The closest art concerning the removal of gases such as ammonia utilizing a potential silica-based compound doped with a metal is taught within WO 00/40324 to Kemira Agro Oy. Such a system, however, is primarily concerned with providing a filter media that permits regeneration of the collected gases, presumably for further utilization, rather than permanent removal from the atmosphere. Such an ability to easily regenerate (i.e., permit release of captured gases) such toxic gases through increases of temperature or changes in pressure unfortunately presents a risk to the subject environment. To the contrary, an advantage of a system as now proposed is to provide effective long-duration breakthrough (thus indicating thorough and effective removal of unwanted gases in substantially their entirety from a subject space over time), as well as thorough and effective uptake of substantially all such gases as indicated by an uptake measurement. The Kemira reference also is concerned specifically with providing a dry mixture of silica and metal (in particular copper I salts, ultimately), which, as noted within the reference, provides the effective uptake and regenerative capacity sought rather than permanent and effective gas (such as ammonia) removal from the subject environment. The details of the inventive filter media are discussed in greater depth below.

Additionally, ethylene oxide ("EO") is a highly toxic substance found in various locations as a gas. Stringent governmental guidelines have been developed in an effort to protect workers present within a potentially EO-contaminated environment. The closest art concerning the utilization of zeolites for ethylene oxide modification through dehydration of such a compound to different, harmless, or less harmful, species, is found within U.S. Pat. No. 4,306,106 to Kerr et al. The utilization of impregnated zeolites for EO removal from airstreams is disclosed within U.S. Pat. No. 6,837,917 to Karwacki et al. However, there is no discussion of the availability of such materials in combination with any other compounds for the simultaneous and effective removal of differing noxious gases from certain environments within either of these publications.

BRIEF DESCRIPTION OF THE INVENTION

According to one aspect of this invention, a filter medium comprising a physical mixture of a combination of at least one zeolite material and at least one multivalent metal-doped silicon-based gel material is provided. Preferably, though not necessarily, the gel component materials exhibit a BET surface area of between than 100 and 600 $m^2/g$ (preferably 100 to 400); a pore volume of between about 0.18 cc/g to about 0.7 cc/g as measured by nitrogen porosimetry; a cumulative surface area measured for all pores having a size between 20 and 40 Å of between 50 and 150 $m^2/g$; and wherein the multivalent metal doped on and within said silicon-based gel materials is present in an amount of from 5 to 25% by weight of the total amount of the silicon-based gel materials. Preferably, the gel component of the inventive combination filter medium exhibits a BET surface area is between 150 $m^2/g$ and 250 $m^2/g$; a pore volume of between about 0.25 to about 0.5 cc/g; a cumulative surface area measured for all pores having a size between 20 and 40 Å of between 80 and 120 $m^2/g$; and wherein said multivalent metal is present in an amount of from about 8 to about 20%.

Such a combination exhibits excellent ammonia and ethylene oxide removal as well as a propensity to capture nitrous oxide ($NO_2$) without converting such a compound to another toxic compound, namely nitrogen oxide (NO). Such a combination may be produced in any typical manner of combining at least two particulate materials, including, without limitation, dry blending, wet blending, encapsulation techniques, and the like.

One distinct advantage of this invention is the provision of a filter medium that exhibits highly effective simultaneous ammonia and ethylene oxide breakthrough properties under conditions typical of an enclosed space and over a wide range of relative humidity. Among other advantages of this invention is the provision of a filter system for utilization within an enclosed space that exhibits a steady and effective uptake and breakthrough result for ammonia gas and that removes such noxious gases from an enclosed space at a suitable rate for reduction below critical levels for human exposure. Yet another advantage is the ability of this invention to irreversibly prevent release of noxious gases once adsorbed, under normal conditions. Furthermore, as noted above, such a combination exhibits the ability to capture nitrous oxide without further converting it to nitrogen oxide. Thus, such an invention also encompasses an air filtration medium comprised of a combination of at least two distinct materials, one comprising a silica-based material, the other comprising a zeolite material, wherein said air filitration medium at a 1-cm depth and a 0.1515 residence time, exhibits an ammonia breakthrough of at least 45 minutes when the challenge concentration of ammonia is 1,000 $mg/m^3$ at 25° C. and the breakthrough concentration of ammonia is 35 $mg/m^3$ at 25° C., wherein said air filtration medium exhibits an ethylene oxide breakthrough of at least 40 minutes when the challenge concentration of ethylene oxide is 1,000 $mg/m^3$ at 25° C. and the breakthrough concentration of ethylene oxide is 1.8 $mg/m^3$ at 25° C., and wherein said air filtration medium exhibits the capacity to capture nitrogen dioxide (and its dimmer $N_2O_4$) without further converting it to nitrogen oxide (i.e., the amount of nitrogen oxide converted thereby is below a concentration of 30 $mg/m^3$ at 15 minutes of breakthrough testing for nitrogen dioxide).

Also, said invention encompasses a filter system wherein at least 0.5% by weight of such a filter medium has been introduced therein. The amount may be as high as 100% by weight of the filter medium; however, the inclusion of other filtration materials, such as the aforementioned ASZM-TEDA (for removal of other noxious gaseous materials), is possible as well.

Still another potential aspect of this invention is the inclusion of an oxidizing agent, such as a permanganate or peroxide, during manufacture of the gel materials, as well as possibly during a treating step of the zeolite materials. Such a component aids in capturing nitrogen dioxide and prevents conversion of that noxious gas to another noxious gas, NO, thereby increasing the viability of the overall filter medium as a decontaminant of toxic gases from certain environments.

In terms of the nitrogen oxide benefits, the oxidized gel materials exhibit excellent removal characteristics of both highly toxic gases nitrous oxide and nitrogen dioxide. The US Department of Labor Occupational Safety and Health Administration ("OSHA") has set stringent guidelines aimed at protecting workers performing operations in an environment potentially contaminated with ethylene oxide. The Permissible Exposure Limit ("PEL") for $NO_2$ has been established at 5 ppm, 9 $mg/m^3$ ceiling and NO at 25 ppm, 30 $mg/m^3$. As a result, effective, low cost means of removing nitrogen oxides from ambient streams of air are needed. Of particular interest is the removal capability of nitrogen oxides simultaneously with other potentially toxic industrial chemicals like ammonia.

As noted above, impregnated, activated carbon is known to strongly adsorb a wide variety of organic chemicals from ambient air streams. Such a material is not effective at removing nitric oxide which is a by-product of some reactions with nitrogen oxides. There is additionally an inherent benefit from having a combined absorption of multiple compounds from a single absorbent. Although mixtures and layered bed filters are effective, they can be complex and costly to produce. A single composite particle has distinct advantages from manufacturing, storage, and complexity perspectives, at least.

The present invention, according to one embodiment, comprises an absorbent for removing $NO_2$ from air over a wide range of ambient temperatures, said process comprising contacting the air with an oxidizer impregnated high surface area silica gel alone or part of a composite matrix for a sufficient time to remove nitrogen oxides, specifically NO.

DETAILED DESCRIPTION OF THE INVENTION

For purposes of this invention, the term "silicon-based gel" is intended to encompass materials that are formed from the reaction of a metal silicate (such as sodium silicate) with an acid (such as sulfuric acid) and permitted to age properly to form a gel material or materials that are available from a natural source (such as from rice hulls) and exhibit pore structures that are similar to such gels as formed by the process above. Such synthetic materials may be categorized as either silicic acid or polysilicic acid types or silica gel types, whereas the natural source materials are typically harvested in a certain form and treated to ultimately form the final gel-like product (such a method is provided within U.S. Pat. No. 6,638,354). The difference between the two synthetic categories lies strictly within the measured resultant pH level of the gel after reaction, formation and aging. If the gel exhibits a pH of below 2.0 after that stage, the gel is considered silicic or polysilicic acid in type. If pH 2.0 or above, then the material is considered a (traditional) silica gel. In any event, as noted above, the term "silicon-based gel" is intended to encompass both of these types of gel materials. It has been found that silicon-based gels exhibiting a resultant pH of less than 2.0 (silicic or polysilicic acid gels) contain a larger percentage of micropores of size less than 20 ' with a median pore size of about 30', while silicon-based gels exhibiting a higher acidic pH, such as pH of 3.0 and above (preferably, though not necessarily, as high as 4) contain a mixture of pore sizes having a median pore size of about 30 ' to about 60'. While not wishing to be held by theory, it is believed that capture of toxic gases, such as ammonia, is accomplished by two separate (but potentially simultaneous) occurrences within the pores of the metal-doped silicon-based gels: acid-base reaction and complexation reaction. Thus silicon-based gels formed at pH <2 contain more residual acid than the gels formed at pH 3-4, however the gels formed at pH 3-4 contain more pores of size suitable to entrap a metal, such as copper, and thus have more metal available for a complexation reaction. It is believed that the amount of a gas such as ammonia that is captured and held by the silicon-based gel results from a combination of these two means. The term "multivalent metal salt" is intended to include any metal salt having a metal exhibiting a valence number of at least three. Such a multivalent metal is particularly useful to form the necessary complexes with ammonia; a valence number less than three will not readily form such complexes.

The hydrous silicon-based gels that are used as the base materials for metal doping as well as the basic materials for the desired air filtration medium may be prepared from acid-set silica hydrogels. Silica hydrogel may be produced by reacting an alkali metal silicate and a mineral acid in an aqueous medium to form a silica hydrosol and allowing the hydrosol to set to a hydrogel. When the quantity of acid reacted with the silicate is such that the final pH of the reaction mixture is acidic, the resulting product is considered an acid-set hydrogel. Sulfuric acid is the most commonly used acid, although other mineral acids such as hydrochloric acid, nitric acid, or phosphoric acid may be used. Sodium or potassium silicate may be used, for example, as the alkali metal silicate. Sodium silicate is preferred because it is the least expensive and most readily available. The concentration of the aqueous acidic solution is generally from about 5 to about 70 percent by weight and the aqueous silicate solution commonly has an $SiO_2$ content of about 6 to about 25 weight percent and a molar ratio of $SiO_2$ to $Na_2O$ of from about 1:1 to about 3.4:1.

The alkali metal silicate solution is added to the mineral acid solution to form a silica hydrosol. The relative proportions and concentrations of the reactants are controlled so that the hydrosol contains about 6 to about 20 weight percent $SiO_2$ and has a pH of less than about 5 and commonly between about 1 to about 4. Generally, continuous processing is employed and alkali silicate is metered separately into a high-speed mixer. The reaction may be carried out at any convenient temperature, for example, from about 15° C. to about 80° C. and is generally carried out at ambient temperatures.

The silica hydrosol will set to a hydrogel in generally about 5 to about 90 minutes and is then washed with water or an aqueous acidic solution to remove residual alkali metal salts which are formed in the reaction. For example, when sulfuric acid and sodium silicate are used as the reactants, sodium sulfate is entrapped in the hydrogel. Prior to washing, the gel is normally cut or broken into pieces in a particle size range of from about ½ to about 3 inches. The gel may be washed with an aqueous solution of mineral acid such as sulfuric acid, hydrochloric acid, nitric acid, or phosphoric acid or a medium strength acid such as formic acid, acetic acid, or propionic acid.

Generally, the temperature of the wash medium is from about 27° C. to about 93° C. Preferably, the wash medium is at a temperature of from about 27° C. to about 38° C. The gel is washed for a period sufficient to reduce the total salts content to less than about 5 weight percent. The gel may have, for example, a $Na_2O$ content of from about 0.05 to about 3 weight percent and a $SO_4$ content of from about 0.05 to about 3 weight percent, based on the dry weight of the gel. The period of time necessary to achieve this salt removal varies with the flow rate of the wash medium and the configuration of the washing apparatus. Generally, the period of time necessary to achieve the desired salt removal is from about 0.5 to about 3 hours. Thus, it is preferred that the hydrogel be washed with water at a temperature of from about 27° C. to about 38° C. for about 0.5 to about 3 hours. In one potential embodiment, the washing may be limited in order to permit a certain amount of salt (such as sodium sulfate), to be present on the surface and within the pores of the gel material. Such salt is believed, without intending on being limited to any specific scientific theory, to contribute a level of hydration that may be utilized for the subsequent metal doping procedure to effectively occur as well as contributing sufficient water to facilitate complexation between the ammonia gas and the metal itself upon exposure.

In order to prepare hydrous silicon-based gels suitable for use in the filter media of this invention, the final gel pH upon completion of washing as measured in 5 weight percent aqueous slurry of the gel, may range from about 1.5 to about 5.

The washed silica hydrogel generally has a water content, as measured by oven drying at 105° C. for about 16 hours, of from 10 to about 60 weight percent and a particle size ranging from about 1 micron to about 50 millimeters. Alternatively the hydrogel is then dewatered to a desired water content of from about 20 to about 90 weight percent, preferably from about 50 to about 85 weight percent. Any known dewatering method may be employed to reduce the amount of water therein or conversely increase the solids content thereof. For example, the washed hydrogel may be dewatered in a filter, rotary dryer, spray dryer, tunnel dryer, flash dryer, nozzle dryer, fluid bed dryer, cascade dryer, and the like.

The average particle size referred to throughout this specification is determined in a MICROTRAC® particle size analyzer. When the water content of the hydrogel is greater than about 90 weight percent, the hydrogel may be pre-dried in any suitable dryer at a temperature and for a time sufficient to reduce the water content of the hydrogel to below about 85 weight percent to facilitate handling, processing, and subsequent metal doping.

Generally, the hydrogel materials after formation and aging are of very coarse sizes and thus should be broken apart to facilitate proper metal impregnation. Such a size reduction may be accomplished by various methods, including milling, grinding, and the like. One option, however, is to subject the hydrogel materials to high shear mixing during the metal doping procedure. In such a step, the particle sizes can be reduced to the sizes necessary for proper filter utilization. Alternatively, the hydrogel particles may be ground to relatively uniform particles sizes concurrently during doping or subsequent to the doping step. In such alternative manners, the overall production method can effectuate the desired homogeneous impregnation of the metal for the most effective noxious gas removal upon utilization as a filter medium.

Thus, in one possible embodiment, the silica hydrogel is wet ground in a mill in order to provide the desired average particle size suitable for further reaction with the metal dopant and the subsequent production of sufficiently small pore sizes for the most effective ammonia gas trapping and holding while present within a filter medium. For example, the hydrogels may be concurrently ground and dried with any standard mechanical grinding device, such as a hammer mill, as one non-limiting example. The ultimate particle sizes of the multivalent-metal impregnated (doped) silicon-based gel materials are dependent upon the desired manner of providing the filter medium made therefrom. Thus, packed media will require larger particle sizes (from 10 to 100 microns, for example) whereas relatively small particles sizes (from 1 to 20 microns, for example) may be utilized as extrudates within films or fibers. The important issue, however, is not the particle sizes in general, but the degree of homogeneous metal doping effectuated within the pores of the subject hydrogels themselves.

The hydrous silicon-based gel product after grinding preferably remains in a wet state (although drying and grinding may be undertaken, either separately or simultaneously; preferably, though, the materials remain in a high water-content state for further reaction with the metal dopant) for subsequent doping with a multivalent metal salt in order to provide effective ammonia trapping and holding capability within a filter medium. Such a wet state reaction is thus encompassed within the term "wet reaction" or "wet react" for this invention. Without intending on being bound to any specific scientific theory, it is believed that the wet state doping permits incorporation of sufficient metal species within the pores of the silicon-based gel product to permit sufficient complexation of the target ammonia. In a wet state, the pores of the subject silicon-based gel product are large enough in volume to allow for the metal salt to enter therein. Subsequent drying thus appears to shrink the pores around the resultant metal to a volume that, upon introduction of target ammonia gas, causes the ammonia to condense into a liquid. It is apparently this liquid that then exists within the small volume pores that will contact with the metal species to effectuate complexation therewith upon transfer of water present on the metal as hydrates. Thus, it is believed that the production of small volume pores around the metal species therein to a level wherein the remaining volume within such pores is small enough to permit such condensation of the target ammonia followed by reliable metal contact for the needed substantially permanent complexation for effective capture of the ammonia molecules is best provided through the wet state reaction noted above. Included as one possible alternative within the term "wet reaction" or "wet react" is the ability to utilize gel particles that have been dried to a certain extent and reacted with an aqueous multivalent metal salt solution in a slurry. Although the resultant performance of such an alternative filter medium does not equal that of the aforementioned product of pre-dried, wet, gel particles with a metal salt, such a filter medium does exhibit performance results that exceed gels alone, or dry-mixed metal-treated salt materials. Such an alternative method has proven effective and is essential when utilizing the natural source materials (from rice hulls, for example, and as noted above) as reactants with an aqueous multivalent metal salt solution.

The metals that can be utilized for such a purpose include, as alluded to above, any multivalent metal, such as, without limitation, cobalt, iron, manganese, zinc, aluminum, chromium, copper, tin, antimony, indium, tungsten, silver, gold, platinum, mercury, palladium, cadmium, and nickel. For cost reasons, copper and zinc are potentially preferred, with copper most preferred. The listing above indicates the metals possible for production during the doping step within the pores of the subject silicon-based gel materials. The metal salt is preferably water-soluble in nature and facilitates dissociation of the metal from the anion when reacted with silica-based materials. Thus, sulfates, chlorides, bromides, iodides, nitrates, and the like, are possible as anions, with sulfate, and thus copper sulfate, most preferred as the metal doping salt (cupric chloride is also potentially preferred as a specific compound; however, the acidic nature of such a compound may militate against use on industrial levels). Without intending on being bound to any specific scientific theory, it is believed that copper sulfate enables doping of copper [as a copper (II) species] in some form to the silicon-based gel structure, while the transferred copper species maintains its ability to complex with ammonium ions, and further permits color change within the filter medium upon exposure to sufficient amounts of ammonia gas to facilitate identification of effectiveness of gas removal and eventual saturation of the filter medium. In such a manner, it is an easy task to view the resultant filtration system empirically to determine if and when the filter medium has been saturated and thus requires replacement.

The wet state doping procedure has proven to be particularly useful for the provision of certain desired filter efficiency results, as noted above. A dry mixing of the metal salt and silicon-based gel does not accord the same degree of impregnation within the gel pores necessary for ammonia capture and retention. Without such a wet reaction, although capture may be accomplished, the ability to retain the trapped ammonia (in this situation, the ammonia may actually be modified upon capture or within the subject environment to ammonium hydroxide as well as a portion remain as ammonia gas) can be reduced. It is believed, without intending on being limited to such a theory, that in such a product, ammonia capture is still effectuated by metal complexation, but the lack of small pore volumes with metal incorporated therein limits the ability for the metal to complex strongly enough to prevent release upon certain environmental changes (such as, as one example, high temperature exposure). Such a result is actually the object of the closest prior art. As in the noted Kemira reference above, a dry mix procedure produces a regenerable filter medium rather than a permanent capture and retention filter medium. The particular wet reaction is discussed more specifically within the examples below, but, in its broadest sense, the reaction entails the reaction of a silicon-based gel with introduced water present in an amount of at least 50% by weight of the gel and metal salt materials. Preferably, the amount of water is higher, such as at least 70%; more preferably at least 80%, and most preferably at least 85%. If the reaction is too dry, proper metal doping will not occur as the added water is necessary to transport the metal salts into the pores of the gel materials. Without sufficient amounts of metal within such pores, the gas removal capabilities of the filter medium made therefrom will be reduced. The term "added" or "introduced" water is intended to include various forms of water, such as, without limitation, water present within a solution of the metal salt or the gel, hydrated forms of metal salts, hydrated forms of residual gel reactant salts, such as sodium sulfate, moisture, and relative humidity; basically any form that is not present as an integral part of the either the gel or metal salt itself, or that is not transferred into the pores of the material after doping has occurred. Thus, as non-limiting examples, again, the production of gel material, followed by drying initially with a subsequent wetting step (for instance, slurrying within an aqueous solution, as one non-limiting example), followed by the reaction with the multivalent metal salt, may be employed for this purpose, as well as the potentially preferred method of retaining the gel material in a wet state with subsequent multivalent metal salt reaction thereafter.

Water is also important, however, to aid in the complexation of the metal with the subject noxious gas within the gel pores. It is believed, without intending on being bound to any specific scientific theory, that upon doping the metal salt is actually retained but complexed, via the metal cation, to the silicon-based gel within the pores thereof (and some may actual complex on the gel surface but will more readily become de-complexed and thus removed over time; within the pores, the complex with the metal is relatively strong and thus difficult to break). The presence of water at that point aids in removing the anionic portion of the complexed salt molecule through displacement thereof with hydrates. It is believed that these hydrates can then be displaced themselves by, as one example, the ammonia gas (or ammonium ions) thereby producing an overall gel/metal/ammonium complex that is strongly associated and very difficult to break, ultimately providing not only an effective ammonia gas capture mechanism, but also a manner of retaining such ammonia gases substantially irreversibly. The water utilized as such a complexation aid can be residual water from the metal doping step above, or present as a hydrated form on either the gel surface (or within the gel pores) or from the metal salt reactant itself. Furthermore, and in one potentially preferred embodiment, such water may be provided through the presence of humectants (such as glycerol, as one non-limiting example).

Furthermore, of importance as well is the potentially preferred embodiment of contacting and/or reacting the gel material with an oxidizing agent to provide extra nitrogen oxide removal capabilities. Any oxidizing material within those categorized in Classes 1 through 4 would be suitable, with Class 1 and 2 types preferred due to safety issues in handling during incorporation. Examples of Class 1 types include aluminum nitrate, potassium dichromate, ammonium persulfate, potassium nitrate, barium chlorate, potassium persulfate, barium nitrate, silver nitrate, barium peroxide, sodium carbonate peroxide, calcium chlorate, sodium dichloro-s-triazinetrione, calcium nitrate, sodium dichromate, calcium peroxide, sodium nitrate, cupric nitrate, sodium nitrite, hydrogen peroxide (8-27.5%), sodium perborate, lead nitrate, sodium perborate tetrahydrate, lithium hypochlorite, sodium perchlorate monohydrate, lithium peroxide, sodium persulfate, magnesium nitrate, strontium chlorate, magnesium perchlorate, strontium nitrate, magnesium peroxide, strontium peroxide, nickel nitrate, zinc chlorate, nitric acid (<70% conc.), zinc peroxide, and perchloric acid (<60% concen.). Examples of Class 2 types include calcium hypochlorite (<50% wgt), potassium permanganate, chromium trioxide (chromic acid), sodium chlorite (<40% wgt.), halane, sodium peroxide, hydrogen peroxide (27.5-52% conc.), sodium permanganate, nitric acid (>70% conc.), and trichloro-s-triazinetrione. Examples of Class 3 types include ammonium dichromate, potassium chlorate, hydrogen peroxide (52-91% conc.), potassium dichloroisocyanurate, calcium hypochlorite (>50% wgt.), sodium chlorate, perchloric acid (60-72.5% conc.), sodium chlorite (>40% wgt.), potassium bromate, and sodium dichloro-s-triazinetrione. Examples of Class 4 types include ammonium perchlorate, ammonium permanganate, guanidine nitrate, hydrogen peroxide (>91% conc.), perchloric acid (>72.5%), and potassium superoxide. Preferably the oxidizing material is potassium permanganate or calcium peroxide. The amount of oxidizing agent contacted there with the gel material particles is from 0.1 to 8 percent by weight. The contacting/reacting may occur during gel production or, and preferably, thereafter, in order to allow sufficient amount of oxidizing agent to attach to sites on the gel surfaces. Likewise, the oxidizing agents discussed above may be contacted with the zeolite component of the inventive filter medium prior to incorporation with the doped and treated gel materials in the same manner and in the same amounts.

The inventive silicon-based gel particles thus have been doped (impregnated) with at least one multivalent metal salt (such as, as one non-limiting example, copper sulfate) in an amount of from about 2 to about 30 wt %, expressed as the percentage weight of base metals, such as copper, of the entire dry weight of the metal-impregnated (doped) silicon gel-based particles. Such resultant metal-doped silicon-based gel materials thus provide a filter medium that exhibits a breakthrough time for an ammonia gas/air composition having a 1000 mg/m$^3$ ammonia gas concentration when exposed to ambient pressure (i.e., from 0.8 to 1.2 atmospheres, or roughly from 0.81 to 1.25 kPa) and temperature (i.e., from 20-25° C.) of at least 35 mg/m$^3$ when applied to a filter bed of at most 2 cm height within a flask of 4.1 cm in diameter, and wherein said ammonia gas captured by said filter medium does not exhibit any appreciable regeneration upon exposure to a temperature up to 250° C. at ambient pressure for 70 hours.

The zeolite component is not required to be impregnated or reacted with any other compounds in order to be effective and thus is preferably in acid form (referred to as the hydrogen form or alternatively, H-ZSM-5) during utilization within the process of this invention. Impregnation or treatment of the zeolite with oxidizer does afford additional protections against the reduction of $NO_2$ to other species like NO, however. The preferred zeolite of the present invention, H-ZSM-5, may be purchased from commercial sources, such as Zeolyst or UOP. Alternatively, H-ZSM-5 may be synthesized using techniques known to one skilled in the art and discussed, as one example, within U.S. Pat. No. 3,702,886. ZSM-5 is a high silica zeolite consisting of a series of interconnecting parallel and sinusoidal channels approximately 5.8 A in diameter (Szostak, Molecular Sieves: Principles of Synthesis and Identification, 1989, p. 14, 23-25). ZSM-5 is also a member of the pentisil family of zeolites which includes zeolitic materials whose structure consists of 5-membered rings and include other compounds known within the industry as ZSM-8 and ZSM-11, as non-limiting examples. Such pentisil zeolites are thus potentially preferred compounds within this inventive combination filter medium as well. Again, it is a potentially preferred embodiment that the zeolite component be treated similarly in terms of oxidizing agents as for the gel materials noted previously.

According to another embodiment, the present invention comprises a process for the removal of EO, ammonia, nitrogen oxide, and/or formaldehyde from air over a wide range of ambient temperatures and relative humidity conditions, said process comprising contacting the air with the inventive combination of metal-doped silicon gel-based materials and zeolites for a sufficient time period to remove ethylene oxide, ammonia, nitrous oxide, and/or formaldehyde. Without intending to be limited to any specific scientific theory, it is believed that the subject ammonia, nitrous oxide, and formaldehyde gases are removed through the adsorption of gas within the pores of the materials involved and subsequent capture by the metal dopant present therein. The EO gas is removed, again without any intention of specific scientific theory, from the ambient air stream via adsorption of EO into the pores of the zeolite followed by chemical reaction, not limited to but including hydrolysis to form various glycols.

The contact time between the filter medium and the noxious gas(es) and the ambient air stream being treated can vary greatly depending on the nature of the application, such as for example, the desired filtration capacity, flow rates and concentration of EO in the ambient air stream. However, in order to achieve a threshold level of EO removal, the contact time (e.g., bed depth divided by the superficial linear velocity) should be greater than about 0.05 seconds. A contact time of greater than 0.1 seconds is preferred for most applications, and a contact time of greater than 0.4 seconds is even more preferred for applications involving high concentrations of EO, or for applications where it is desired to achieve a high EO capacity in, e.g., a filter bed.

ZSM-5 can be prepared with a range of $SiO_2/Al_2O_3$ ratios, from greater than or equal to about 10,000 to less than or equal to about 20. Because of its high silica content and small pores, ZSM-5 is hydrophobic, adsorbing a relatively small amount of water under high RH conditions. As synthesized and subsequent to ion exchange, ZSM-5 exists as small crystals. According to various embodiments of the present invention, the zeolite may be configured in any form, such as particles, rings, cylinders, spheres, and the like. Alternatively, the zeolite, e.g., H-ZSM-5, may be configured as a monolith, or coated onto the walls of a ceramic material, such as for example honeycomb corderite. Failure to configure the zeolite (e.g., H-ZSM-5 crystals) as described above will result in excessive pressure drop across the filtration media. Configuring the zeolite, preferably H-ZSM-5 crystals, into various geometrical shapes can be performed using operations well known to one skilled in the art, such as such varied techniques as include pilling, extruding, and the like. Binders, such as for example clays, silicates, and plastics, are not necessary for employment of the zeolite within this invention; however the utilization of such binders in the formation of zeolite forms is preferred.

The filtration device employing the novel combination of materials may be of any shape and/or geometric form depending upon the desired application, as long as the filtration device promotes contact between the stream being treated and the filter medium itself. The removal efficiency of the noxious gas contaminated air stream passes through the filter medium will be a function of many parameters, such as, for example, the bed depth, the ambient concentration of noxious gas, relative humidity, flow rate, and the like. Examples of filtration devices which may utilize the present invention include but are not limited to, for example, gas mask canisters, respirators, filter banks such as those employed in fume hoods, ventilation systems, and the like. A blower motor, fan, etc. may be used as a means of forcing ambient air through the device, if desired.

The combination of hydrous silicon-based gels and zeolites are employed in the filter medium of this invention in an amount from about 1 to about 90 percent, preferably about 5 to about 70 percent, by weight of the entire filter medium composition. Preferably, the zeolite is present in a major amount (greater than 50%) of the combination.

The filter medium of the invention can also further contain as optional ingredients, silicates, clays, talcs, aluminas, carbons, polymers, including but not limited to polysaccharides, gums or other substances used as binder fillers. These are conventional components of filter media, and materials suitable for this purpose need not be enumerated for they are well known to those skilled in the art. Furthermore, such metal-doped silicon-based gels of the invention may also be introduced within a polymer composition (through impregnation, or through extrusion) to provide a polymeric film, composite, or other type of polymeric solid for utilization as a filter medium. Additionally, a nonwoven fabric may be impregnated, coated, or otherwise treated with such invention materials, or individual yarns or filaments may be extruded with such materials and formed into a nonwoven, woven, or knit web, all to provide a filter medium base as well. Additionally, the inventive filter media may be layered within a filter canister with other types of filter media present therewith (such as layers of activated carbon, or, alternatively, the filter media may be interspersed together within the same canister. Such films and/or fabrics, as noted above, may include discrete areas of filter medium, or the same type of interspersed materials (activated carbon mixed on the surface, or co-extruded, as merely examples, within the same fabric or film) as well.

The filter system utilized for testing of the viability of the medium typically contains a media bed thickness of from about 1 cm to about 3 cm thickness, preferably about 1 cm to about 2 cm thickness within a 4.1-cm diameter tube. Without limitation, typical filters that may actually include such a filter medium, for example, for industrial and/or personal use, will comprise greater thicknesses (and thus amounts) of such a filter medium, from about 1-15 cm in thickness and approximately 10 cm in diameter, for example for personal canister filter types, up to 400 cm in thickness and 200 cm in diameter, at least, for industrial uses. Again, these are only intended to be rough approximations for such end use applications; any thickness, diameter, width, height, etc., of the bed and/or the container may be utilized in actuality, depending on the length of time the filter may be in use and the potential for gaseous contamination the target environment may exhibit.

Any amount of filter medium may be introduced within a filter system, as long as the container is structurally sufficient to hold the filter medium therein and permits proper airflow in order for the filter medium to properly contact the target gases.

It is important to note that although ammonia and ethylene oxide (and at times, nitrous oxide) gases are the test subjects for removal by the inventive filter media discussed herein, such media may also be effective in removing other noxious gases from certain environments as well, including formaldehyde and methylamine, as merely examples.

As previously mentioned, the filter medium can be used in filtration applications in an industrial setting (such as protecting entire industrial buildings or individual workers, via masks), a military setting (such as filters for vehicles or buildings or masks for individual troops), commercial/public settings (office buildings, shopping centers, museums, governmental locations and installations, and the like), and personal settings (such as homes, vehicles, etc., with large filters or personal gas masks). Specific examples may include, without limitation, the protection of workers in agricultural environments, such as within poultry houses, as one example, where vast quantities of ammonia gas can be generated by animal waste. Thus, large-scale filters may be utilized in such locations, or individuals may utilize personal filter apparatuses for such purposes. Furthermore, such filters may be utilized at or around transformers that may generate certain noxious gases. Generally, such inventive filter media may be included in any type of filter system that is necessary and useful for the removal of potential noxious gases in any type of environment.

PREFERRED EMBODIMENTS OF THE INVENTION

Copper content was determined utilizing an ICP-OES model Optima 3000 available from PerkinElmer Corporation, Shelton, Conn.

The % solids of the adsorbent wet cake were determined by placing a representative 2 g sample on the pan of a CEM 910700 microwave balance and drying the sample to constant weight. The weight difference is used to calculate the % solids content. Pack or tapped density is determined by weighing 100.0 grams of product into a 250-mL plastic graduated cylinder with a flat bottom. The cylinder is closed with a rubber stopper, placed on the tap density machine and run for 15 minutes. The tap density machine is a conventional motor-gear reducer drive operating a cam at 60 rpm. The cam is cut or designed to raise and drop the cylinder a distance of 2.25 in. (5.715 cm) every second. The cylinder is held in position by guide brackets. The volume occupied by the product after tapping was recorded and pack density was calculated and expressed in g/ml.

The conductivity of the filtrate was determined utilizing an Orion Model 140 Conductivity Meter with temperature compensator by immersing the electrode epoxy conductivity cell (014010) in the recovered filtrate or filtrate stream. Measurements are typically made at a temperature of 15-20° C.

Surface area is determined by the BET nitrogen adsorption methods of Brunaur et al., *J. Am. Chem. Soc.*, 60, 309 (1938).

Accessible porosity has been obtained using nitrogen adsorption-desorption isotherm measurements. The BJH (Barrett-Joiner-Halender) model average pore diameter was determined based on the desorption branch utilizing an Accelerated Surface Area and Porosimetry System (ASAP 2010) available from Micromeritics Instrument Corporation, Norcross, Ga. Samples were out gassed at 150-200° C. until the vacuum pressure was about 5 μm of Mercury. This is an automated volumetric analyzer at 77° K. Pore volume is obtained at pressure $P/P_0=0.99$. Average pore diameter is derived from pore volume and surface area assuming cylindrical pores. Pore size distribution ($\Delta V/\Delta D$) is calculated using BJH method, which gives the pore volume within a range of pore diameters. A Halsey thickness curve type was used with pore size range of 1.7 to 300.0 nm diameter, with zero fraction of pores open at both ends.

The $N_2$ adsorption and desorption isotherms were classified according to the 1985 IUPAC classification for general isotherm types including classification of hysteresis to describe the shape and inter connectedness of pores present in the silicon based gel.

Adsorbent micropore area ($S_{micro}$) is derived from the Halsey isotherm equation used in producing a t-plot. The t-plot compares a graph of the volume of nitrogen absorbed by the adsorbent gel as compared with the thickness of the adsorbent layer to an ideal reference. The shape of the t-plot can be used to estimate the micropore surface area. Percent microporosity is then estimated by subtracting the external surface area from the total BET surface area, where $S_{micro}=S_{BET}-S_{ext}$. Thus % BJH microporosity=$S_{micro}/S_{BET}\times 100$.

The level of metal impregnate is expressed on a % elemental basis. A sample impregnated with about 5 wt % of copper exhibits a level of copper chloride so that the percent Cu added to the silicon-based gel is about 5 wt % of Cu/adsorbent Wt. In the case of cupric chloride dihydrate, then ($CuCl_2 \cdot 2H_2O$), 100 g of dry adsorbent would be impregnated with dry 113.65 g of cupric chloride. Thus, the calculation is basically made as % Metal=Weight of elemental metal in metal salt/(weight of dry silicon-based gel+weight of total dry metal salt).

Test Materials

COMPARATIVE EXAMPLE 1

Particles of commercially available ASZM TEDA carbon available from Calgon Incorporated, were sized by sieving to recover particles sized between 1000 μm and 425 μm.

COMPARATIVE EXAMPLE 2

Particles of commercially available sodium ZSM5 zeolite available from Zeolyst Incorporated, were procured.

COMPARATIVE EXAMPLE 3

A sample of the zeolite from Comparative Example 2, above, was converted to the acid form. 200 g Zeolyst powder was dispersed in 1000 g deionized water. To this suspension was added 80 g ammonium nitrate and the mixture stirred for 2 hours before being filtered and washed. The recovered wet solids were again dispersed in 1000 g deionized water with 40 g ammonium nitrate and again stirred for 2 hours. The solids were filtered and washed before being dried for 16 hr at 105° C. The dry exchanged zeolite was then calcined at 550° C. for 2 hours to yield the acid H-ZSM5.

To form granules and increase product density, 100 g of the dried particles prepared above were compacted in a roller compactor (TF-Labo available from Vector Corporation) using a pressing force 70 bar to form crayon-shaped agglomerates, which were then sized by sieving to recover granules sized between 850 μm and 425 μm. Finally, the granules were re-hydrated by placing them in a controlled temperature/humidity chamber set to 36° C. and 50% RH for 18 hours.

INVENTIVE EXAMPLE 1

Silicon-Based Gel

Particles of silicon-based gel were produced by adding a solution of 11.4% sulfuric acid solution to 2000 ml 24.7% sodium silicate (3.3 mole ratio) solution with agitation at 300-400 rpm until the pH of the solution reached the target pH of 3.0. The suspension was then discharged into 5000 ml deionized water at 85° C. for the 30 minutes to complete gel formation. The gel cake was recovered by filtration to form a mass of gel particles with conductivity of less than 3000 µS. Next, the gel was broken apart with further agitation. The washed particles are then filtered and collected and the resulting particles were dried in an oven set at 105° C. for 16 hours. To form granules and increase product density, 200 g of the dried blend prepared above were compacted in a roller compactor (TF-Labo available from Vector Corporation) using a pressing force 7 bar to form crayon-shaped agglomerates, which were then sized by sieving to recover granules sized between 850 µm and 425 µm.

INVENTIVE EXAMPLE 2

Wet gel cake from Example 13 was impregnated with copper by adding 1500 g amount of gel wet cake formed above (17.35% solids) and 500 g of deionized water. To this add 1.3 g 98% H2SO4 and 390 g of $CuSO_4.5H_2O$. (The % solids of the dried gel, determined according to the method described above, was used to estimate the quantity of impregnate required to achieve the desired metal level.) The slurry was then agitated at 3000 rpm for 15 minutes at ambient temperature. The uniform slurry was then placed directly in an oven set at 105° C. and dried overnight (16 hours). To form granules and increase product density, 200 g of the dried blend prepared above were compacted in a roller compactor (TF-Labo available from Vector Corporation) using a pressing force 7 bar to form crayon-shaped agglomerates, which were then sized by sieving to recover granules sized between 850 µm and 425 µm.

INVENTIVE EXAMPLE 3

Weigh 99.35 g of CBV3020E (dry, uncompacted zeolite ZSM5 from Zeolyst, Inc, West Chester, Pa.). Load into a Cuisinart® mixer. Dissolve 0.65 g of KMnO4 in 52 g of water. While under shear, add the potassium permanganate solution dropwise to the zeolite to form discrete 0.5-1 mm granules. If necessary add additional water to aid in the granulation process. Recover wet granules and oven dry the granules at 90 deg C. to ~13.05% moisture. Sieve to recover granules sized between 850 µm and 425 µm.

These initially made examples were then tested for ammonia and EO breakthrough, as well as for nitrous oxide capture and conversion to NO. The general protocol utilized for breakthrough measurements involved the use of two parallel flow systems having two distinct valves leading to two distinct absorbent beds (including the filter medium), connected to two different infrared detectors (or a sampling system utilizing a gas chromatograph or NOx analyzer), followed by two mass flow controllers and then a vacuum source. The overall system basically permitting mixing of ammonia, air, and water vapor within the same pipeline for transfer to either adsorbent bed with some excess vented to a filtration system. In such a manner, the uptake of the filter media within the two absorbent beds was compared for ammonia concentration after a certain period of time through the analysis via the infrared detector as compared with the non-filtered ammonia/air mixture produced simultaneously. A vacuum was utilized at the end of the system to force the ammonia/air mixture through the two parallel flow systems as well as the non-filtered pipeline with the flow controlled using 0-50 SLPM mass flow controllers.

To generate the ammonia/air mixture, two mass flow controllers generated challenge concentration of test gas, one being a challenge air mass flow controller having a 0-100 SLPM range and the other being an ammonia mass flow controller having a 0-100 sccm range. A third air flow controller, was used to control the flow through a heated water sparger to maintain the desired challenge air relative humidity (RH). Two dew point analyzers, one located in the challenge air line above the beds and the other measuring the effluent RH coming out of one of the two filter beds, were utilized to determine the RH thereof (modified for different levels).

The beds were 4.1 cm glass tubes with a baffled screen to hold the adsorbent. The adsorbent was introduced into the glass tube using a fill tower to obtain the best and most uniform packing each time.

The challenge chemical concentration was then measured using one of three detectors according to the test gas: (1) a HP 5890 gas chromatograph with a FID for EO, (2) an infrared detector for ammonia, and (3) a NOx analyzer for $NO_2$. The effluent concentration of ammonia was measured using an infrared spectroscope (MIRAN), previously calibrated at a specific wavelength for the test gas.

The adsorbent was prepared for testing by screening all of the particles below 40 mesh (0.425 mm in diameter). The largest particles were typically no larger than a 20 mesh (0.85 mm in diameter).

The valves above the two beds were initially closed. The diluent air flow and the water sparger air flow were started and the system was allowed to equilibrate at the desired temperature and RH. The valves above the beds were then changed and simultaneously the chemical flow was started at a rate of 4.75 SLPM. The chemical flow was set to achieve the desired challenge chemical concentration. The effluent concentrations from the two absorbent beds (filter media) were measured continuously using the previously calibrated infrared spectroscopes. The breakthrough time was defined as the time when the effluent chemical concentration equals the target breakthrough concentration. For ammonia tests, the challenge concentration was 1,000 mg/m$^3$ at 25° C. and the breakthrough concentration was 35 mg/m$^3$ at 25° C. For ethylene oxide tests, the challenge concentration was 1,000 mg/m$^3$ at 25° C. and the breakthrough concentration was 1.8 mg/m$^3$ at 25° C.

Ammonia breakthrough was then measured for distinct filter medium samples, with the fixed bed depth of 1 cm such samples modified as noted, the relative humidity adjusted, and the flow units of the test gas changed to determine the effectiveness of the filter medium under different conditions. EO breakthrough was tested in the same manner, with only the gas changed.

Protection from nitrous oxides is a critical characteristic of media designed to protect against chemical agents. Breakthrough testing was performed using the granular absorbent of this invention alone and in series with Calgon ASZM-TEDA carbon.

The breakthrough time was defined as the time when the effluent chemical concentration equals the target breakthrough concentration. For NOx tests, the challenge concentration was 375 mg/m$^3$ at 25° C. and the breakthrough concentration was 9 mg/m$^3$ at 25° C. for $NO_2$ and 30 mg/m$^3$ at 25° C. for NO. To be acceptable an absorbent must maintain a downstream concentration below 9 and 30 mg/m³ for a minimum of 15 minutes at both 15% and 80% Relative Humidity conditions.

The results are tabulated below:

TABLE 1

Testing Results

| | EO breakthrough at 80% RH | NH₃ breakthrough at 15% RH | NO₂ to NO conversion? |
|---|---|---|---|
| Comparative Example 1 | 1.5 | 10 | no |
| Comparative Example 3 | 85 | 15 | Yes |
| Inventive Example 2 | 5 | 110 | None |
| Inventive Example 3 | 100 | 40 | None |

Thus, Inventive Example 3 exhibited the highest removal of both EO and ammonia while also exhibiting no conversion of nitrous oxide to nitrogen oxide. Further combinations of such materials were then prepared in different ways to determine if any specific blending technique provided the best overall performance of such a filter medium combination.

Protection from nitrous oxides is a critical characteristic of media designed to protect against chemical agents. Breakthrough testing was performed using the granular absorbent of this invention alone and in conjunction with Calgon ASZM-TEDA carbon.

The breakthrough time was defined as the time when the effluent chemical concentration equals the target breakthrough concentration. For NOx tests, the challenge concentration was 375 mg/m³ at 25° C. and the breakthrough concentration was 9 mg/m³ at 25° C. for $NO_2$ and 30 mg/m³ at 25° C. for NO. To be acceptable an absorbent must maintain a downstream concentration below 9 and 30 mg/m3 for a minimum of 15 minutes at 80% Relative Humidity.

TABLE 2

Nitrous Oxides Breakthrough Testing

| Run # | Test Bed 1 | Test Bed 2 | Concentration, mg/m³ at 6 minutes | | Concentration, mg/m³ at 15 minutes | |
|---|---|---|---|---|---|---|
| | | | NO₂ | NO | NO₂ | NO |
| Test Gas | | | | | | |
| A | Inventive Example #4 | — | 7.5 | 0 | 10 | 0.6 |
| B | Inventive Example #4 | ASZM TEDA | 6.3 | 0 | 7.5 | 0 |

Thus, the inventive combinations exhibited highly surprising, excellent results in terms of noxious gas filtration for such diverse chemicals, in particular the very low levels of nitrogen oxide, if any, converted from nitrous oxide (well below a concentration of 1.0 mg/m³ after 15 minutes of breakthrough testing).

Nitrogen Oxide Removal—Oxidizer-Treated Gel Production

The alternative embodiment including an oxidizing material for nitrogen oxide removal including production of the following products:

INVENTIVE EXAMPLE 4

Blend 60 g of granules form Example 3 (0.65 wt % KMnO4 doped HZSM-5) with 20 g of Cu impregnated silicic gel granules to yield a mixed uniform particle absorbent media.

INVENTIVE EXAMPLE 5

Weigh 99.9 g of CBV3020E HZSM-5 (0.54 wt % moisture). Dissolve 0.1 g of KMnO4 crystals in 52 mls of water. Load the zeolite in a Cuisinart® mixer and mix vigorously. Add the permanganate solution dropwise to the Zeolite to form granules. If necessary use additional water to complete the granulation process. Dry the formed granules at 65 deg C. (10-15%) moisture for 16 hours and sieve to recover granules sized between 850 μm and 425 μm.

INVENTIVE EXAMPLE 6

Weigh 99.5 g of CBV3020E HZSM-5 (0.54 wt % moisture). Dissolve 0.5 g of KMnO4 crystals in 52 mls of water. Load the HZSM-5 in a Cuisinart mixer and start the shear. Add the permanganate solution dropwise to the Zeolite to form granules. If necessary use additional water to complete the granulation process. Dry the formed granules at 105 deg C. 18.5 wt % moisture and sieve to recover granules sized between 850 μm and 425 μm.

INVENTIVE EXAMPLE 7

Weigh 99 g of CBV3020E ZSM-5 (0.54 wt % moisture). Dissolve 1.0 g of KMnO4 crystals in 52 mls of water. Load the ZSM-5 in a Cuisnart mixer and start the shear. Add the permanganate solution dropwise to the Zeolite to form granules. If necessary use additional water to complete the granulation process. Dry the formed granules at 105 deg C. 10-15 wt % moisture and sieve to recover granules sized between 850 μm and 425 μm

INVENTIVE EXAMPLE 8

Weigh 96 g of CBV3020E ZSM-5 (4.5 wt % moisture). Dissolve 1.0 g of KMnO4 crystals in 32 mls of water. Load the ZSM-5 in a Cuisnart mixer and start the shear. Add the permanganate solution dropwise to the Zeolite to form granules. If necessary use additional water to complete the granulation process. Dry the formed granules at 85 deg C. to 10-15% moisture and sieve to recover granules sized between 850 μm and 425 μm.

INVENTIVE EXAMPLE 9

The copper impregnated gel of Example 2 was doped with potassium permanganate by mixing 455 g of Example 2 slurry (22.45% solids) with 4 g KMnO4 crystals. The slurry was stirred at 2000 rpm for 30 minutes and dried in an oven for 16 hours at 100° C. To a moisture level of 30%. To form hard granules and increase product density, 100 g of the dried blend prepared above were compacted in a roller compactor (TF-Labo available from Vector Corporation) using a pressing force 7 bar to form crayon-shaped agglomerates, which were then sized by sieving to recover granules sized between 850 μm and 425 μm.

INVENTIVE EXAMPLE 10

Blend 24 g of granules of Example 3 with 8 g of oxidizer impregnated gel granules from Example 9 to form a 3:1 ratio blend of uniform particles.

INVENTIVE EXAMPLE 11

Blend 24 g of 989-51B (0.1 wt % KMnO4 doped HZSM-5) with 8 g of granules from Example 9 to form a 3:1 ratio blend of uniform particles.

INVENTIVE EXAMPLE 12

The copper impregnated gel of Example 14 was doped with potassium permanganate by mixing 455 g of Example 14 slurry (22.45% solids) with 4 g KMnO4 crystals. The slurry was stirred at 2000 rpm for 20 minutes and dried in an oven for 16 hours at 100° C. of dried silicic acid gel from Example X, add 4 g calcium peroxide powder and 10 g deionized water drop wise while dispersing in Cuisinart blender to effect a homogeneous powder. To form hard granules and increase product density, 100 g of the dried blend prepared above were compacted in a roller compactor (TF-Labo available from Vector Corporation) using a pressing force 7 bar to form crayon-shaped agglomerates, which were then sized by sieving to recover granules sized between 850 µm and 425 µm.

INVENTIVE EXAMPLE 13

Blend 25% by weight 20×40 mesh granules of Example 2 with 75% CBV3020E HZSM-5. Adjust all weight to a dry basis. Mixed both granules in a V-blender to achieve the representative distribution of uniform particles.

INVENTIVE EXAMPLE 14

Combine recovered power from Example 12 and combine with powdered CBV3020E in a ratio of 25:75 in a Cuisinart® mixer until uniform. To form hard granules and increase product density, 100 g of the dried blend prepared above were compacted in a roller compactor (TF-Labo available from Vector Corporation) using a pressing force 7 bar to form crayon-shaped agglomerates, which were then sized by sieving to recover granules sized between 850 µm and 425 µm.

INVENTIVE EXAMPLE 15

Weigh 96 g of CBV3020E ZSM-5 (4.5 wt % moisture). Weigh 4.0 g of KMnO4 crystals and add to the Zeolite. Mill both compound together using a Cuisinart mixer to form a uniform powder. To form hard granules and increase product density, 100 g of the dried blend prepared above were compacted in a roller compactor (TF-Labo available from Vector Corporation) using a pressing force 7 bar to form crayon-shaped agglomerates, which were then sized by sieving to recover granules sized between 850 µm and 425 µm.

INVENTIVE EXAMPLE 16

A solution containing 0.65 g potassium permanganate was dissolved in 52 g water and added drop wise in a Cuisnart mixer to 99.35 g HZSM-5 powder. With mixing at high shear, fine granules are formed. These granules are dried for 16 hours at 90° C. to approximately 13% moisture. To form hard granules and increase product density, 100 g of the dried blend prepared above were compacted in a roller compactor (TF-Labo available from Vector Corporation) using a pressing force 7 bar to form crayon-shaped agglomerates, which were then sized by sieving to recover granules sized between 850 µm and 425 µm.

The copper impregnated gel of Example 2 was doped with potassium permanganate by mixing 455 g of Example 2 slurry (22.45% solids) with 4 g KMnO4 crystals. The slurry was stirred at 2000 rpm for 30 minutes and dried in an oven for 16 hours at 100° C. To a moisture level of 30%. To form hard granules and increase product density, 100 g of the dried blend prepared above were compacted in a roller compactor (TF-Labo available from Vector Corporation) using a pressing force 7 bar to form crayon-shaped agglomerates, which were then sized by sieving to recover granules sized between 850 µm and 425 µm.

These granules were combined in a ratio of 2.22:1 to form a homogenous granular blend.

INVENTIVE EXAMPLE 17

The procedures described in Example 16 were replicated and granules were combined in a ratio of 2.5:1 to form a homogenous granular blend.

INVENTIVE EXAMPLE 18

A solution containing 0.65 g potassium permanganate was dissolved in 52 g water and added drop wise in a Cuisnart mixer to 99.35 g HZSM-5 powder. With mixing at high shear, fine granules are formed. These granules are dried for 16 hours at 90° C. to approximately 13% moisture. To form hard granules and increase product density, 100 g of the dried blend prepared above were compacted in a roller compactor (TF-Labo available from Vector Corporation) using a pressing force 7 bar to form crayon-shaped agglomerates, which were then sized by sieving to recover granules sized between 850 µm and 425 µm.

Applying the procedures described in Example 16, these granules were combined with Example 16 gel granules in a ratio of 1.86:1 to form a homogenous granular blend.

Nitrogen Dioxide Breakthrough and Capture; NO Conversion

In accordance with the tests run for the ammonia and ethylene oxide removal above, these samples were tested for both ammonia and nitrogen oxide removal as well. The results were as follows:

TABLE 3

Ammonia and Nitrous Oxides Breakthrough Results

|  | Oxidizer treatment on ZSM-5, % | Oxidizer treatment on gel silica, % | $NH_3$ removal at 15% RH, Minutes before breakthrough | $NO_2$ removal at 15% RH, Minutes before breakthrough | NO removal at 15% RH, Minutes before breakthrough |
| --- | --- | --- | --- | --- | --- |
| Inv. Ex. 1 | — | 0 | 50 | <0.5 | 0.5 |
| Inv. Ex. 2 | — | 0 | 90 | 1 | 1 |
| Inv. Ex. 3 | 0.65 | — | 39 | 23 | 25 |

TABLE 3-continued

Ammonia and Nitrous Oxides Breakthrough Results

| | Oxidizer treatment on ZSM-5, % | Oxidizer treatment on gel silica, % | $NH_3$ removal at 15% RH, Minutes before breakthrough | $NO_2$ removal at 15% RH, Minutes before breakthrough | NO removal at 15% RH, Minutes before breakthrough |
|---|---|---|---|---|---|
| Inv. Ex. 4 | 0.65 | 4 | 42 | 7 | 17 |
| Inv. Ex. 5 | 0.1 | — | 68 | 4 | 6 |
| Inv. Ex. 6 | 0.5 | — | — | >25 | 18.5 |
| Inv. Ex. 7 | 1 | — | — | 35 | 45 |
| Inv. Ex. 8 | 4 | — | — | 77 | 100 |
| Inv. Ex. 9 | 0 | 4 | 68 | 11 | 35 |
| Inv. Ex. 10 | 0.65 | 4 | 47 | 21 | 35 |
| Inv. Ex. 11 | 0.1 | 4 | 45 | 11 | 18 |
| Inv. Ex. 12 | — | 4 | 56 | *1 | 38 |
| Inv. Ex. 13 | 0 | 4 | 46 | 7 | 10 |
| Inv. Ex. 14 | 0 | 4 | — | 11 | 17 |
| Inv. Ex. 15 | 4 | — | — | 1 | 1 |
| Inv. Ex. 16 | 4 | 0.65 | 47 | 24 | 31 |
| Inv. Ex. 17 | 4 | 0.65 | 41 | 27 | 33 |
| Inv. Ex. 18 | 4 | 1 | 41 | 45 | 57 |

*$NO_2$ concentration exceeded 5 ppm in the first minute and peaked out at 32 ppm after 5 minutes. The effluent concentration however trended downwards to 18 ppm over the duration of the test with no nitric oxide (NO) conversion or breakthrough Thus, the oxidizer-treated materials, whether including solely treated gel or both treated gel and zeolite, exhibited significantly improved and highly desirable nitrogen oxide capture and prevention of conversion to NO.

While the invention was described and disclosed in connection with certain preferred embodiments and practices, it is in no way intended to limit the invention to those specific embodiments, rather it is intended to cover equivalent structures structural equivalents and all alternative embodiments and modifications as may be defined by the scope of the appended claims and equivalents thereto.

What we claim is:

1. A filter medium comprising a combination of at least two materials, one comprising a multivalent metal-doped silicon-based gel material, and the other comprising a zeolite material, wherein at least said gel material is further treated with an oxidizing material, and wherein said zeolite is optionally treated with an oxidizing material.

2. The filter medium of claim 1 wherein said multivalent metal-doped silicon-based gel material exhibits a BET surface area of between 100 and 600 m²/g; a pore volume of between about 0.18 cc/g to about 0.7 cc/g as measured by nitrogen porosimetry; a cumulative surface area measured for all pores having a size between 20 and 40 Å of between 50 and 150 m²/g; and wherein the multivalent metal doped on and within said silicon-based gel material is present in an amount up to 25% by weight of the total amount of the silicon-based gel material.

3. The filter medium of claim 1 wherein said multivalent metal is selected from the group consisting of cobalt, iron, manganese, zinc, aluminum, chromium, copper, tin, antimony, tungsten, indium, silver, gold, platinum, mercury, palladium, cadmium, nickel, and any combinations thereof.

4. The filter medium of claim 3 wherein said multivalent metal is copper.

5. The filter medium of claim 1 wherein said zeolite material is a pentisil zeolite.

6. The filter medium of claim 5 wherein said pentisil zeolite is ZSM-5.

7. The filter medium of claim 2 wherein said zeolite material is a pentisil zeolite.

8. The filter medium of claim 7 wherein said pentisil zeolite is ZSM-5.

9. The filter medium of claim 3 wherein said zeolite material is a pentisil zeolite.

10. The filter medium of claim 9 wherein said pentisil zeolite is ZSM-5.

11. The filter medium of claim 1 wherein said oxidizing material is selected from at least one Class 1 oxidizing material, at least one Class 2 oxidizing material, at least one Class 3 oxidizing material, at least one Class 4 oxidizing material, and any mixtures thereof.

12. The filter medium of claim 11 wherein said oxidizing material is selected from the group consisting of a permanganate, a peroxide, and any mixtures thereof.

13. The filter medium of claim 12 wherein said permanganate is potassium permanganate and said peroxide is calcium peroxide.

14. The filter medium of claim 11 wherein said zeolite is also treated with said oxidizing material.

15. The filter medium of claim 14 wherein said oxidizing material treating said zeolite is selected from at least one Class 1 oxidizing material, at least one Class 2 oxidizing material, at least one Class 3 oxidizing material, at least one Class 4 oxidizing material, and any mixtures thereof.

16. The filter medium of claim 15 wherein said oxidizing material treating said zeolite is selected from the group consisting of a permanganate, a peroxide, and any mixtures thereof.

17. The filter medium of claim 16 wherein said permanganate is potassium permanganate and said peroxide is calcium peroxide.

18. A filter system comprising the filter medium as defined in claim 1.

19. A filter system comprising the filter medium as defined in claim 2.

20. A filter system comprising the filter medium as defined in claim 3.

21. A filter system comprising the filter medium as defined in claim 4.

22. A filter system comprising the filter medium as defined in claim 5.

23. A filter system comprising the filter medium as defined in claim 6.

24. A filter system comprising the filter medium as defined in claim 7.

25. A filter system comprising the filter medium as defined in claim 8.

26. A filter system comprising the filter medium as defined in claim 9.

27. A filter system comprising the filter medium as defined in claim 10.

28. A filter system comprising the filter medium as defined in claim 11.

29. A filter system comprising the filter medium as defined in claim 12.

30. A filter system comprising the filter medium as defined in claim 13.

31. A filter system comprising the filter medium as defined in claim 14.

32. A filter system comprising the filter medium as defined in claim 15.

33. A filter system comprising the filter medium as defined in claim 16.

34. A filter system comprising the filter medium as defined in claim 17.

* * * * *